No. 684,931. Patented Oct. 22, 1901.
D. B. HANSON.
SAWMILL SET WORKS.
(Application filed Oct. 12, 1899.)
(No Model.) 4 Sheets—Sheet 1.
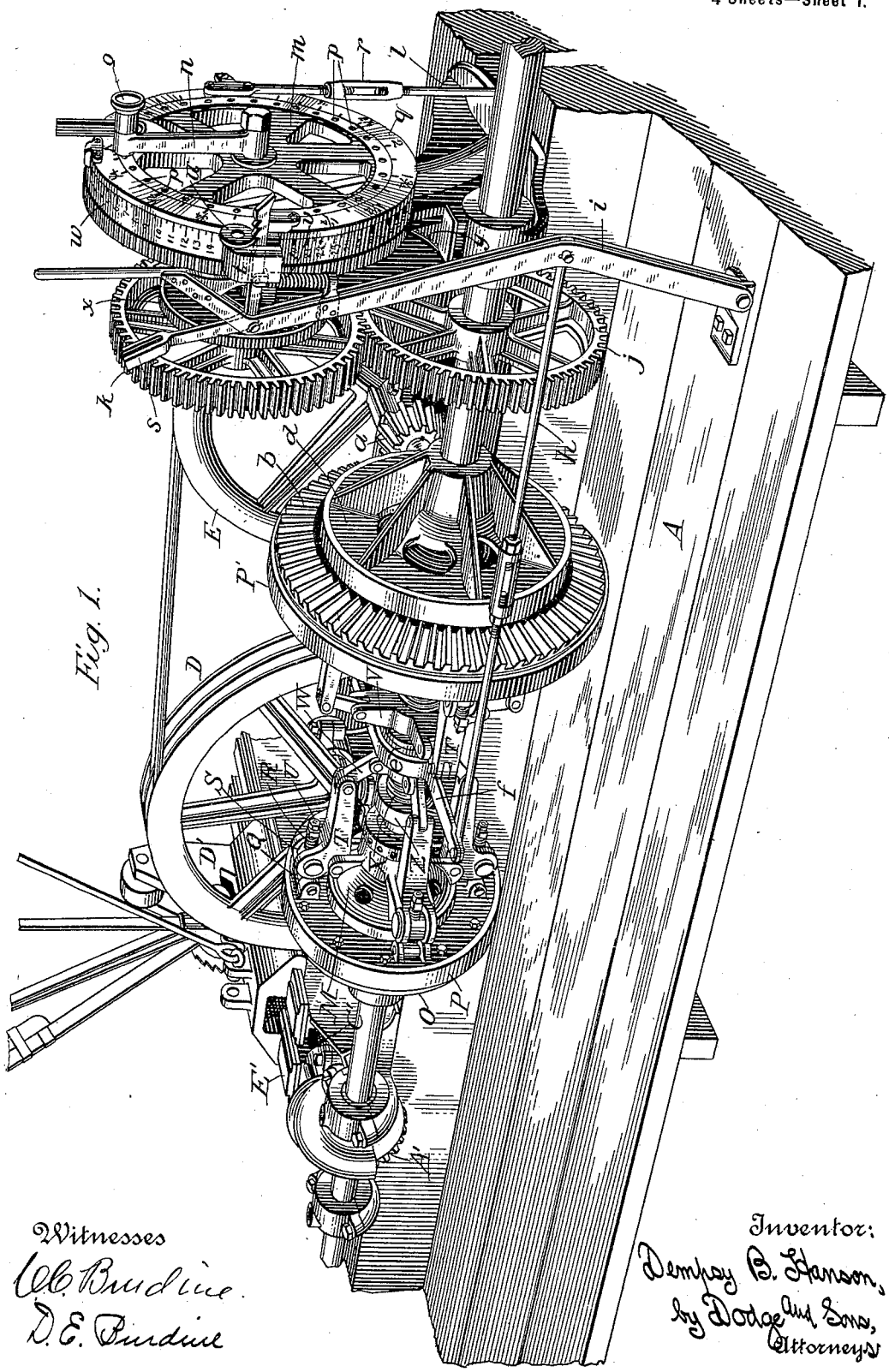

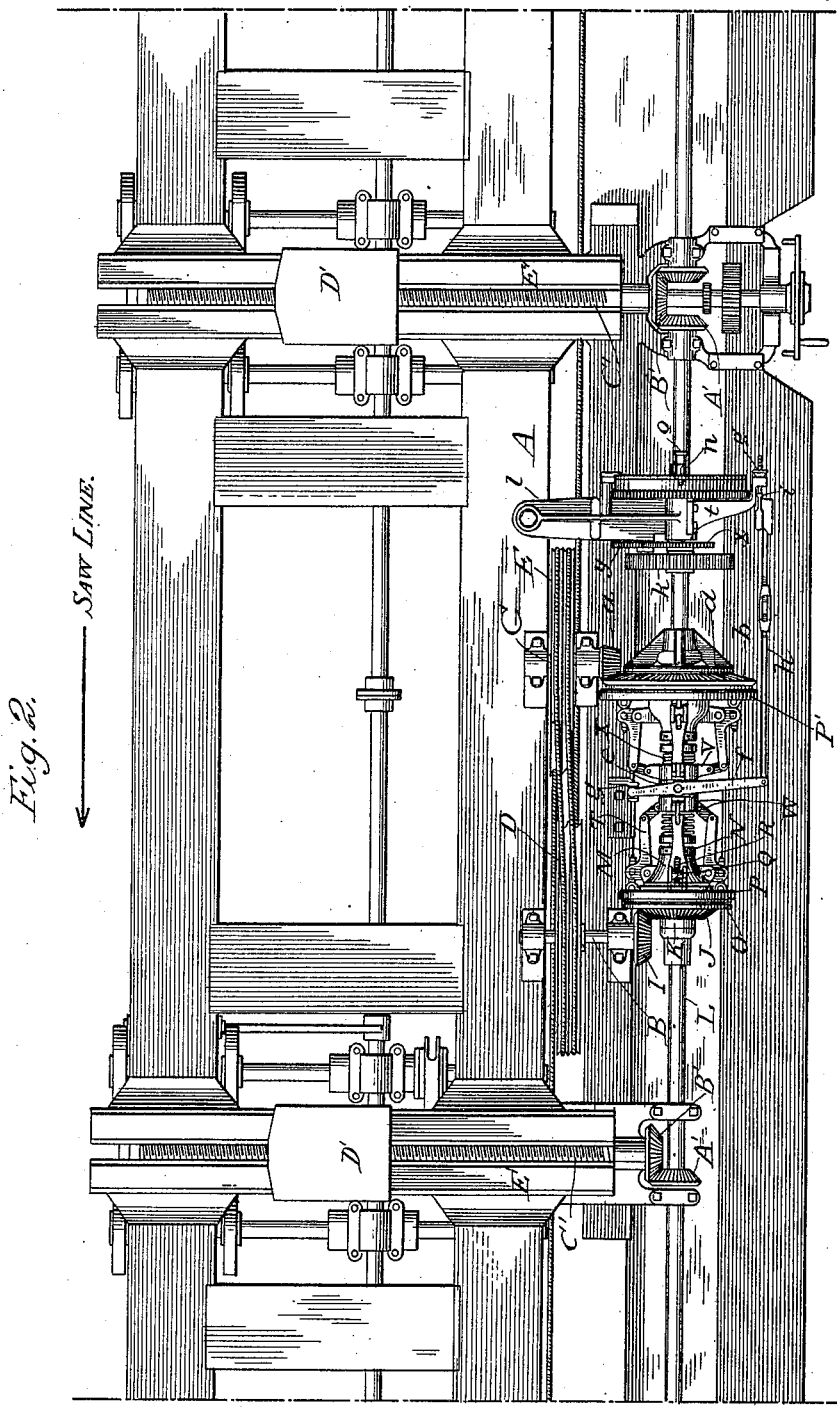

No. 684,931. Patented Oct. 22, 1901.
D. B. HANSON.
SAWMILL SET WORKS.
(Application filed Oct. 12, 1899.)
(No Model.) 4 Sheets—Sheet 3.
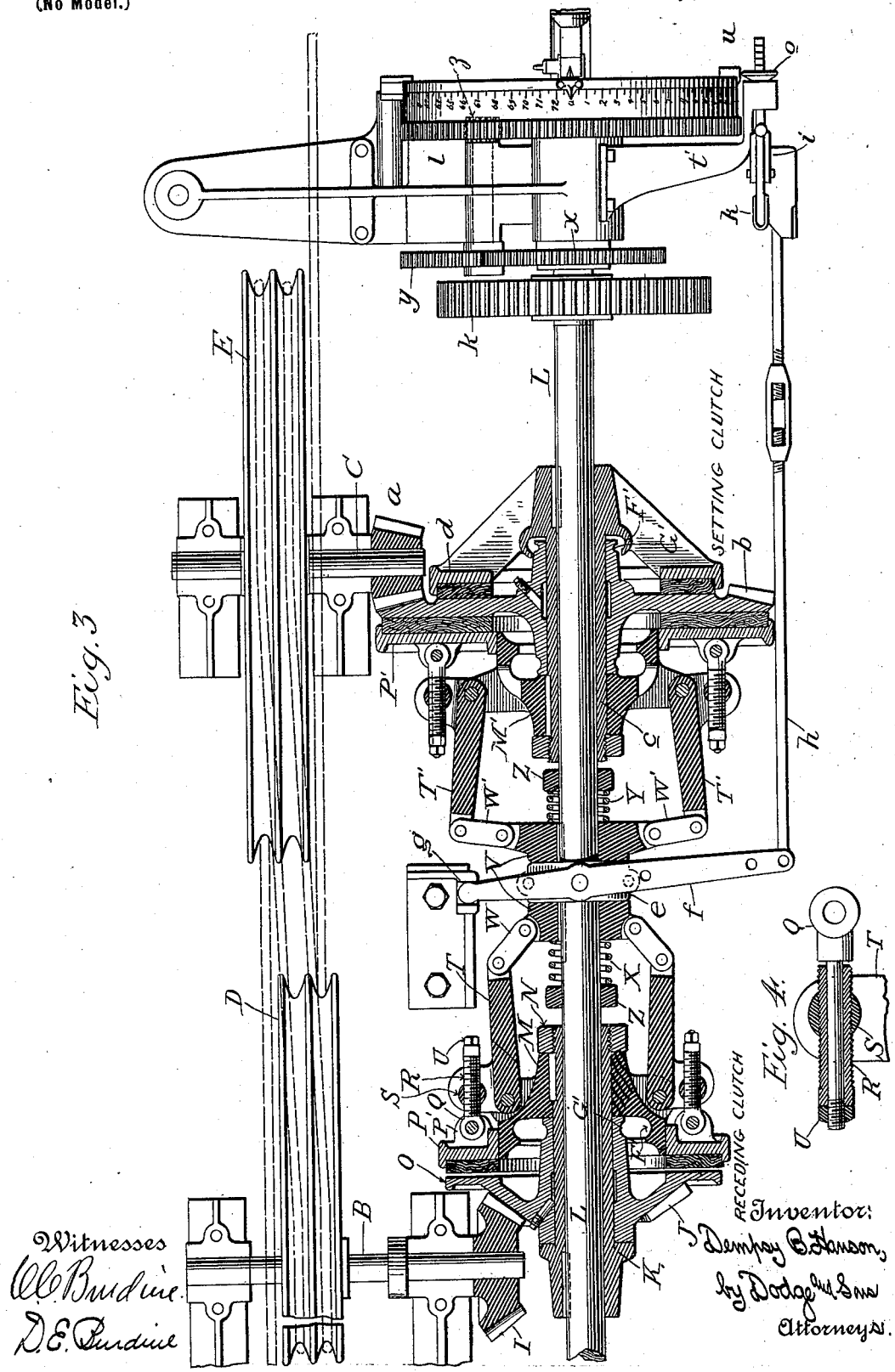

No. 684,931. Patented Oct. 22, 1901.
D. B. HANSON.
SAWMILL SET WORKS.
(Application filed Oct. 12, 1899.)
(No Model.) 4 Sheets—Sheet 4.
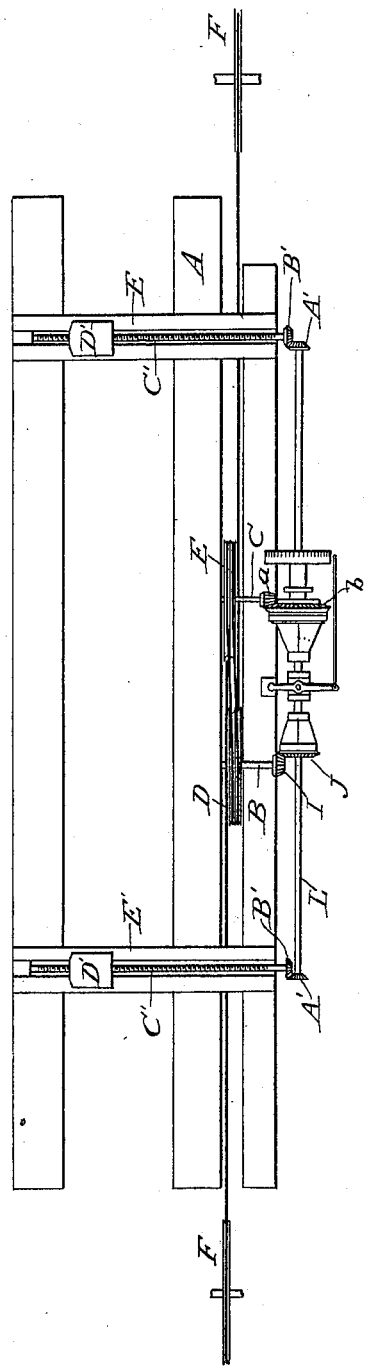
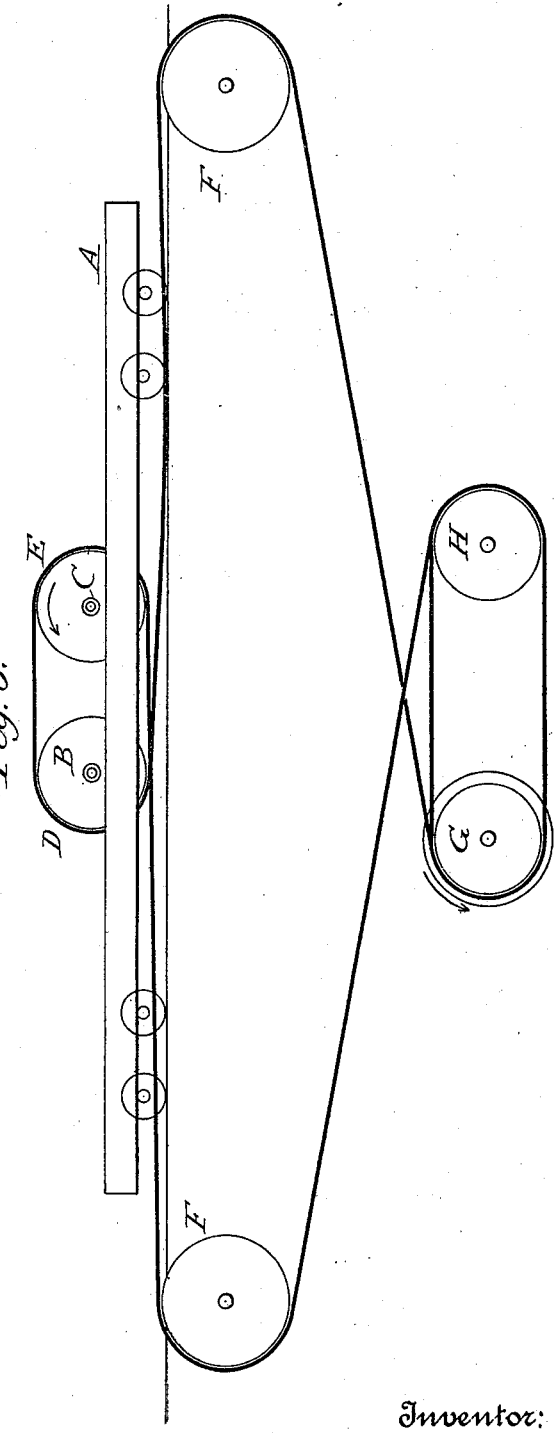
Witnesses
Inventor:
Dempsy B. Hanson,
by Dodge and Sons,
Attorneys
THE NORRIS PETERS CO., PHOTO-LITHO., WASHINGTON, D. C.

UNITED STATES PATENT OFFICE.

DEMPSY B. HANSON, OF SEATTLE, WASHINGTON, ASSIGNOR, BY MESNE ASSIGNMENTS, OF ONE-HALF TO ALLIS-CHALMERS COMPANY, A CORPORATION OF NEW JERSEY.

SAWMILL SET-WORKS.

SPECIFICATION forming part of Letters Patent No. 684,931, dated October 22, 1901.

Application filed October 12, 1899. Serial No. 733,398. (No model.)

*To all whom it may concern:*

Be it known that I, DEMPSY B. HANSON, a citizen of the United States, residing at Seattle, in the county of King and State of Washington, have invented certain new and useful Improvements in Sawmill Set-Works, of which the following is a specification.

My present invention pertains to improvements in sawmill set-works, the construction and advantages of which will be hereinafter set forth, reference being had to the annexed drawings, wherein—

Figure 1 is a perspective view of the set-works; Fig. 2, a top plan view; Fig. 3, a horizontal sectional view of the clutch mechanism; Fig. 4, a detail view of a portion of the same; Fig. 5, a diagrammatic plan of the set-works, and Fig. 6 a similar view showing the drive.

The object of my invention is to provide an improved power set-works wherein the driving-sheaves will occupy a position on the carriage intermediate the saw-line and the set-works proper and also to provide such an arrangement of the sheaves and clutch mechanism therefor that the mechanism may be operated through the agency of a single lever.

Other objects and advantages will appear in the following description.

In the drawings, A denotes the carriage, upon which are mounted suitable bearings carrying shafts B C, upon which are secured sheaves D and E, the sheaves being double or provided with two grooves. About these sheaves is passed a cable or the like, said cable also passing around idlers F, a driving sheave or drum G, and a tightener or tension-pulley H.

Upon the end of shaft B is fixed a bevel-gear I, which meshes with a corresponding gear J, rotatably mounted on a sleeve or collar K, which in turn is splined to a shaft L, also called the "set-shaft." A fulcrum-ring M is also mounted on collar K, but is splined thereto and held up to its position by a threaded nut N. Gear J is provided with an outwardly-extending rim O, which is faced off and designed to act in conjunction with the wooden face of a ring or collar P, said collar being so splined to the fulcrum-ring M that it rotates therewith, but may be moved or slid back and forth thereon to bring its wooden face into or out of contact with rim or face O. Upon the ring or collar P is cast a series of lugs P', to each of which is pivoted an arm Q, upon which is mounted an externally-threaded sleeve R, said sleeve working in a threaded block S, swiveled in one end of a lever T. To hold said sleeve in its position on the arm, nuts U are employed. By adjusting said sleeves R the degree of pressure exerted by the levers T may be regulated as desired. The opposite ends of said levers are connected to a swivel-block V through links W, the block being mounted intermediate two heavy coiled springs X and Y, which bear at their outer ends against fixed collars Z.

Shaft C is provided with a gear $a$, which meshes with gear $b$, rotatably mounted on a sleeve $c$, which is splined to the set-shaft L. Both faces of the gear $b$ are faced off, and a suitable fulcrum-ring M', friction-ring P', levers T', and links W' are employed similar to the parts above described. Collar $c$ is formed with an abutment-ring $d$, faced with wood and designed to bear against the face of gear $b$ when the clutch is so adjusted as to lock said gear and the set-shaft together. Normally the clutches are held out of action with the swivel-block V in an intermediate position, so that gears J and $b$ will rotate without imparting any movement to the set-shaft. A strap $e$ is mounted upon the swivel-block, and a lever $f$, having one end connected to a fixed bearing $g$, is connected thereto. The outer end of said lever is in turn connected by an adjustable rod $h$ to a lever $i$, pivoted at its lower end to the carriage (see Fig. 1) near the operator's stand or position.

Mounted upon the set-shaft L is a gear $j$, meshing with a similar gear $k$, the shaft of which is mounted in a suitable bracket $l$, secured upon the platform. The outer end of the shaft carries an index-driver $m$, Fig. 1, and mounted loosely upon a stud extending out therefrom is an indicating and stop arm $n$, carrying a spring-actuated pin $o$, adapted and designed to engage openings $p$, formed in the face of the driver. A suitable index-ring $q$ is seated in the face of the driver and held against rotation therewith by an arm $r$, fastened to the carriage or any fixed part of the mechanism.

Pivotally mounted in the upper portion of lever $i$ is an elbow-lever $s$, one end being formed with suitable notches or teeth and working in or through a bracket $t$, carried by the support or bracket $t'$. (See Fig. 3.) Said arm of the lever is held up in engagement with a hardened-steel disk $u$, carried by the bracket, by a spring $v$, mounted intermediate the arm and a projection secured or formed upon lever $i$.

Mounted upon the periphery of the index-driver is an index gear-ring $w$, graduated, as shown, and adapted to show the distance between the knees, hereinafter referred to, and the saw. This ring is driven through gear $x$, mounted on the shaft of gear $k$, gear $y$, meshing therewith and carried by a shaft supported in suitable bearings formed in the bracket $l$, and a pinion $z$, Fig. 3, carried upon the opposite end of said shaft and taking in the index-ring. These gears will be so proportioned and arranged as to move the index-ring a distance equal to the travel of the knees.

Referring now to Figs. 2 and 5, it will be seen that the set-shaft is provided with suitable bevel-gears $A'$, adapted and designed to mesh with similar gears $B'$, mounted upon shaft $C'$, which extend transversely of the carriage. Said shafts are threaded and serve to actuate the knees $D'$, which work upon suitable guides or ways $E'$, as is usual. The number of knees may vary, and while I have shown but two in Fig. 3 it will be seen that the set-shaft is extended and the number of knees employed may vary according to requirements. The saw-line is indicated in Fig. 2.

In the operation of the device the rope or cable is in continuous motion, and consequently sheaves D and E rotate continuously. The normal position of the clutch mechanism is such that neither clutch—the receding nor the setting clutch—will be in action, the swivel-block V being in an intermediate position. Supposing now the operator desires to set the log forward one-quarter of an inch, he withdraws pin $o$ and moves lever $n$ until the pin comes opposite the opening $p$, in line with the one-quarter-inch mark on the scale $q$. Then by drawing lever $i$ over into the position indicated in Fig. 3 the setting-clutch is brought into action and motion imparted to the set-shaft L and a forward movement to the knees through the connections above described. This movement will continue until lever $n$ comes into contact with the horizontal arm of lever $s$, throwing the same down and releasing it from engagement with the retaining-disk $u$. Immediately this is released the heavy spring Y will draw the clutch out of action and the set-shaft will come to rest. The carriage can then be fed forward to make the cut. While the index-driver is rotating motion is also given to the index-gear $p$, and the amount of forward movement of the knees will be recorded, and as this takes place every time a new set is made the distance between the knees and the saw is shown at a glance. Should a set greater than that indicated on the scale be required, the operator draws lever $s$ over until it comes against lever $i$, thereby throwing the notched arm out of the way of the lever or arm $n$, so that it may rotate the desired distance, when lever $i$ is drawn over to bring the setting-clutch into action. Said lever $i$ must of course be held by the operator until the lever $n$ passes the bracket $t$, when the notched end of lever $s$ may again be brought into operative relation with the locking-disk. When it is desired to withdraw or recede the knees, the operator moves the lever $i$, so as to bring the smaller clutch into position, imparting motion to gear J and giving a reverse motion to the set-shaft and withdrawing the knees. The receding movement of the knees is much quicker than the feed movement, owing to the proportion of the gears employed.

It will be noticed upon reference to Fig. 3 that the fulcrum block or member M is provided with an interiorly-formed groove or channel $F'$, which, in conjunction with a groove $G'$, formed upon the hub of gear J, serves to prevent the lubricant used on the parts from passing down onto the frictional surfaces of the clutch.

Similar grooves and channels are formed in connection with the setting-clutch.

It will be noted from the foregoing description that the driving-sheaves are located upon the carriage at a point intermediate the main operative parts and the saw-line, and consequently occupy a space on the carriage which is otherwise unavailable. In other words, the carriage does not have to be extended or made wider to accommodate these devices, and consequently the working space required therefor does not have to be increased. Again, but a single lever is necessary for the operation of the two clutches—the setting and the receding.

While I have shown and described the driving-sheaves as located on the saw side of the set-shaft, still I do not desire to limit myself to such location in the use of certain portions of the mechanism herein described, as it is clear that they could be located upon the opposite side of the said set-shaft.

Having thus described my invention, what I claim is—

1. In combination with a sawmill-carriage and knees mounted thereon; a set-shaft for operating said knees; a set-clutch and a receding clutch carried by said shaft; power-sheaves D, E, and connections intermediate said sheaves and the clutches; and a lever for throwing one or the other of said clutches into action, substantially as described.

2. In combination with a sawmill-carriage and knees mounted thereon; a set-shaft for operating said knees; a set-clutch and a receding clutch mounted thereon; power-sheaves D, E, and connections intermediate said sheaves and the clutches; means for normally holding both of said clutches out of action; and a lever for throwing one or the other of said clutches into operative position, substantially as described.

3. In combination with a sawmill-carriage and knees mounted thereon; a set-shaft; setting and receding clutches carried by said shaft; power-sheaves D, E; connections intermediate said sheaves and the clutches; a lever for throwing said clutches into action; means for holding said lever when the setting-clutch is working; and means for determining the amount or degree of set imparted to the knees, said means being so arranged as to release the lever when the knees have been set the required distance.

4. In combination with a sawmill-carriage and knees mounted thereon; a set-shaft; setting and receding clutches mounted on said shaft; power-sheaves, and connections intermediate said sheaves and the clutches; springs for holding the clutches normally out of action; and a lever for throwing one or the other of said clutches into working position.

5. In combination with a sawmill-carriage and knees mounted thereon; a set-shaft; clutches carried thereby; power-sheaves and connections intermediate said sheaves and the clutches; a lever $i$ for controlling said clutches; an elbow-lever $s$ carried in the upper end of said lever $i$; a disk $u$ for engaging the notched end of the elbow-lever; and a set-indicator adapted to release the notched end from the disk when the desired set has been made.

6. In combination with a sawmill-carriage and knees mounted thereon, a set-shaft; setting and receding clutches mounted on said shaft; a source of power; connections intermediate said source and the clutches; a set-indicator; connections intermediate said indicator and the set-shaft; an operating-lever for the clutches; means for locking said lever in its position to hold the setting-clutch in operative position; and means carried by the set-indicator adapted to release said lever.

In testimony whereof I have signed my name to this specification in the presence of two subscribing witnesses.

DEMPSY B. HANSON.

Witnesses:
J. V. A. SMITH,
FRANK SHAFER.